United States Patent
Otaki et al.

(10) Patent No.: US 12,189,069 B2
(45) Date of Patent: Jan. 7, 2025

(54) BREAKAGE TIMING PREDICTION SYSTEM OF A RADIATION DETECTOR, RADIATION DETECTOR REPLACEMENT SYSTEM, ANALYSIS DEVICE, AND ANALYSIS METHOD

(71) Applicant: Konica Minolta, Inc., Tokyo (JP)

(72) Inventors: Junichiro Otaki, Hachioji (JP); Makoto Sumi, Tokorozawa (JP); Masaki Suzuki, Hachioji (JP); Hajime Ishimoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/166,709

(22) Filed: Feb. 9, 2023

(65) Prior Publication Data

US 2023/0258835 A1 Aug. 17, 2023

(30) Foreign Application Priority Data

Feb. 15, 2022 (JP) .................................. 2022-020926
Dec. 21, 2022 (JP) .................................. 2022-204591

(51) Int. Cl.
*G01T 7/12* (2006.01)
*G01T 1/20* (2006.01)

(52) U.S. Cl.
CPC ............ *G01T 7/12* (2013.01); *G01T 1/20188* (2020.05)

(58) Field of Classification Search
CPC .............................. G01T 1/20188; G01T 7/12
See application file for complete search history.

(56) References Cited

U.S. PATENT DOCUMENTS

2011/0073769 A1* 3/2011 Enomoto ............... A61B 6/548
250/370.08

FOREIGN PATENT DOCUMENTS

CN 115373016 A * 11/2022
JP 2018091723 A 6/2018

* cited by examiner

*Primary Examiner* — Mark R Gaworecki
(74) *Attorney, Agent, or Firm* — CANTOR COLBURN LLP

(57) ABSTRACT

A breakage timing prediction system of a radiation detector includes: a sensor that detects a physical quantity applied to a radiation detector; a first hardware processor that collects information on the physical quantity detected by the sensor and analyses the collected information on the physical quantity to predict a breakage timing of the radiation detector; and a notifier that gives a notification of information on the predicted breakage timing of the radiation detector.

12 Claims, 3 Drawing Sheets

BREAKAGE TIMING PREDICTION SYSTEM OF A RADIATION DETECTOR, RADIATION DETECTOR REPLACEMENT SYSTEM, ANALYSIS DEVICE, AND ANALYSIS METHOD

CROSS-REFERENCE TO RELATED APPLICATIONS

The present invention claims priority under 35 U.S.C. § 119 to Japanese Application No. 2022-020926, filed on Feb. 15, 2022, and Japanese Application No. 2022-204591, filed on Dec. 21, 2022, the entire contents of which being incorporated herein by reference.

TECHNICAL FIELD

The present disclosure relates to a breakage timing prediction system of radiation detectors, a radiation detector replacement system, an analysis device, and an analysis method.

DESCRIPTION OF THE RELATED ART

It has long been the practice to arrange acceleration sensors in radiation detectors to measure and collect impact acceleration due to drops and bumps.

For example, JP2018-91723A describes arranging an acceleration sensor in a radiation detector, calculating an impact determination value based on the acceleration detection of the acceleration sensor, adding the impact determination value cumulatively, comparing the accumulated value with a predetermined threshold, and reporting when the accumulated value exceeds the predetermined threshold.

However, conventional radiation detectors have thin film transistor (TFT) substrates made of glass, which are often rendered unusable due to glass breakage caused by sudden large shocks rather than cumulative shocks. Therefore, it was difficult to predict the breakage of radiation detectors even when the impact determination value was collected.

In contrast, recently, flexible TFTs that use a flexible material for the TFT substrate have been in practical use, and their use in radiation detectors has made it possible to prevent the radiation detectors from becoming unusable due to cracking of the TFT substrate as in the past.

SUMMARY OF THE INVENTION

However, even in radiation detectors using flexible TFTs, there are cases in which malfunctions occur in the internal electrical system by breakage of the exterior due to shocks and subsequent penetration of liquids such as disinfectant solution or patient fluids. In this case, the TFTs are also affected and become unusable. If a radiation detector is replaced with a new one after it is broken to become unusable, the time between the notification of the breakage to the maintenance service and the replacement is downtime. In addition, the original radiation detector is unusable and impossible to reuse. Therefore, a new radiation detector needs to be purchased, which is costly.

One of the objects of the present invention is to allow repair or replacement of radiation detectors before they become unusable, and thereby to reduce downtime and costs due to radiation detector breakage.

To achieve at least one of the above-mentioned objects, according to an aspect of the present invention, there is provided a breakage timing prediction system of a radiation detector, the system including:
a sensor that detects a physical quantity applied to a radiation detector;
a first hardware processor that
collects information on the physical quantity detected by the sensor, and
analyses the collected information on the physical quantity to predict a breakage timing of the radiation detector; and
a notifier that gives a notification of information on the predicted breakage timing of the radiation detector.

According to another aspect of the present invention, there is provided a radiation detector replacement system including:
a first hardware processor that
collects information on a physical quantity applied to a radiation detector, and
analyses the collected information on the physical quantity to predict a breakage timing of the radiation detector;
a notifier that gives a notification of information on the predicted breakage timing of the radiation detector;
a database in which information on inventory of the radiation detector is registered; and
a second hardware processor that specifies a radiation detector to be replaced with the radiation detector that is predicted to be broken based on the information on the radiation detector registered in the database.

According to another aspect of the present invention, there is provided a radiation detector replacement system including:
a first hardware processor that
collects information on a physical quantity applied to a radiation detector, and
analyses the collected information on the physical quantity to predict a breakage timing of the radiation detector;
a notifier that gives a notification of information on the predicted breakage timing of the radiation detector;
a second hardware processor that accepts replacement of the radiation detector based on the information on the breakage timing of the radiation detector notified by the notifier; and
a database that stores replacement management information on the accepted replacement of the radiation detector.

According to another aspect of the present invention, there is provided an analysis device including:
a first hardware processor that
collects information on a physical quantity applied to a radiation detector,
analyses the collected information on the physical quantity to predict a breakage timing of the radiation detector, and
outputs information on the predicted breakage timing.

According to another aspect of the present invention, there is provided an analysis method including:
collecting information on a physical quantity applied to a radiation detector;
analyzing the collected information on the physical quantity to predict a breakage timing of the radiation detector; and
outputting information on the predicted breakage timing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein.

DETAILED DESCRIPTION

Hereinafter, one or more preferable embodiments of the present invention will be described with reference to the drawings. However, the present invention is not limited to the illustrated examples.

Figure 1:
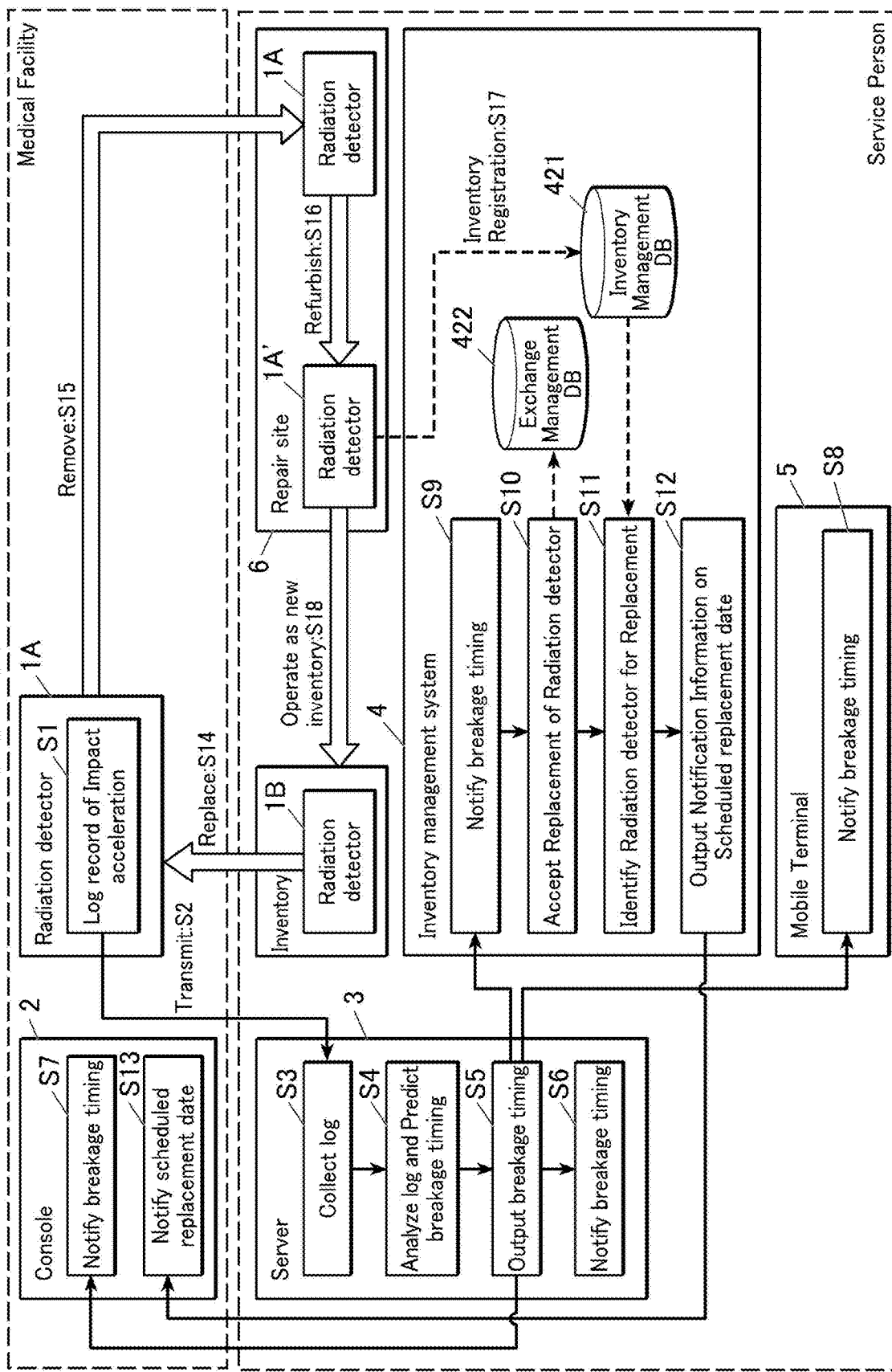
FIG. 1 is a diagram showing an example of the overall structure of the maintenance service according to an embodiment of the present invention.

FIG. 1 schematically illustrates the overall structure and flow of the maintenance service for radiation detectors, including the breakage timing prediction system of radiation detectors and the radiation detector replacement system of the present invention.

As shown in FIG. 1, a medical facility receiving the maintenance service has a radiation detector 1A and a console 2 that controls imaging by the radiation detector 1A. The service provider that provides the maintenance service has a server 3, an inventory management system 4, and a repair site 6. The service provider's service person has a mobile terminal 5.

Hereinafter, the radiation detector being used (or having used) in the medical facility is referred to as a radiation detector 1A, and another radiation detector available for replacement with the radiation detector 1A is referred to as a radiation detector 1B.

Figure 2:
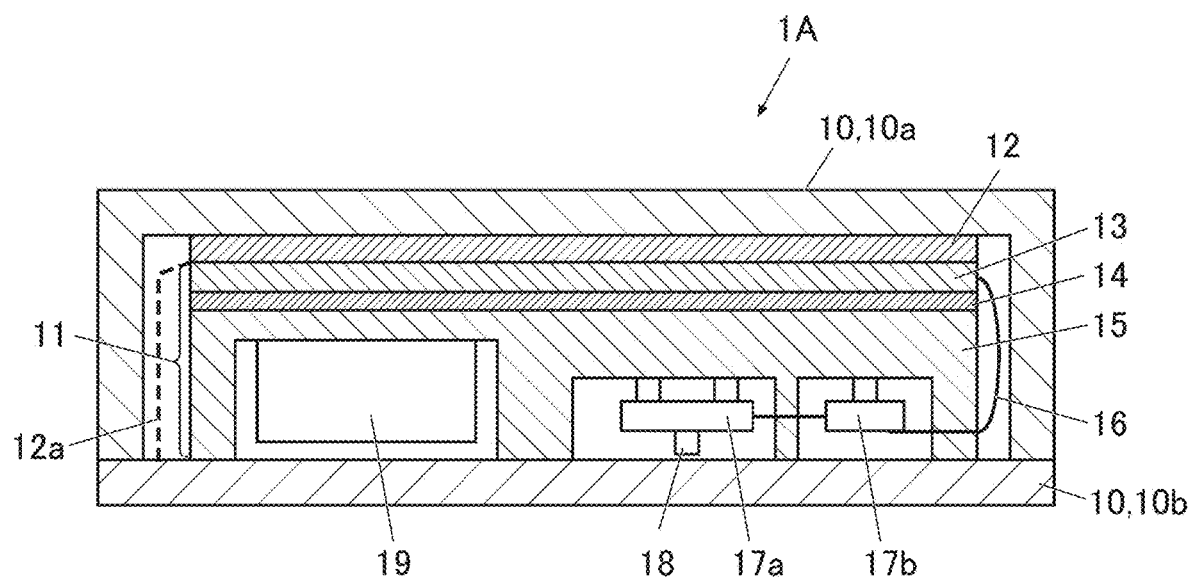
FIG. 2 is a schematic diagram showing a cross section of the radiation detector shown in FIG. 1.

FIG. 2 is a schematic diagram showing a cross section of the radiation detector 1A (and 1B, as well).

As shown in FIG. 2, the radiation detector 1A includes an internal module 11 housed in an exterior 10, and the internal module 11 includes a radiation imaging panel 13, a spacer 15, a control board 17a, an interface board 17b and the like.

The exterior 10 is made of carbon fiber reinforced plastic (CFRP), for example, and is composed of a box-shaped irradiation side exterior 10a, and a rear side exterior 10b as a lid. The box-shaped irradiation side exterior 10a has a front surface as the irradiation surface and side portions. The irradiation side exterior 10a and the rear side exterior 10b are screwed together, for example, and can be easily separated. The joints of the two exteriors, the irradiation side exterior 10a and the rear side exterior 10b, are provided with waterproof components such as packings, which are not illustrated, to prevent liquids from entering the interior.

An adhesive layer 12 is provided on the inner side of the front surface of the irradiation side exterior 10a. The adhesive layer 12 peelably attaches the internal module 11 to the irradiation side exterior 10a by adhesion. The adhesive layer 12 can be a micro-adhesive tape, a micro-adhesive adhesives, or a hot melt adhesive that can be peeled off by heat. Porous materials that can fix the internal module 11 like a low adhesion tape, with the bubbles acting like suction cups, may also be used.

When the radiation detector 1A is subject to any impact such as drops, a force of peeling the internal module 11 off from the irradiation side exterior 10a acts. The adhesive layer 12 needs to be more adhesive over the peeling force in order to avoid peeling off.

The peeling force by impact is determined by the following equation (1):

$$\text{Peeling force by impact (N)} = \text{Mass of Internal module 11 (kg)} \times \text{Acceleration at Internal module 11 generated by impact (m/sec2)} \quad (1)$$

The adhesive force of the adhesive layer 12 is determined by the following equation (2):

$$\text{Adhesive force of Adhesive layer 12 (N)} = \text{Adhesive force per unit width (N/mm)} \times \text{Adhesive width (mm)} \quad (2)$$

The adhesive layer 12 can be adhesive enough to satisfy the following equation (3):

$$\text{Adhesive force of Adhesive layer 12} > \text{Peeling force by impact} \times \text{First safety factor} \quad (3)$$

The first safety factor is preferably at least 1 but may be appropriately selected so that the equation (3) and the equation (4) which will be described later are satisfied.

The adhesive layer 12 is provided with a peeling aid 12a which serves as a retain portion when peeling the internal module 11 from the exterior 10. The peeling aid 12a is made of PET film, for example, and can be used to peel off the internal module 11 from the adhesive layer 12 by holding the peeling aid 12a and pulling it toward the rear side. In this embodiment, the peeling aid 12a is provided on the internal module 11 side of the adhesive layer 12. However, it may be provided on the irradiation side exterior 10a side.

A radiation imaging panel 13 is provided on the irradiation side of the internal module 11. The radiation imaging panel 13, for example, includes a scintillator and a flexible TFT that are laminated and sealed. Flexible TFTs are formed by arranging TFTs, which are a plurality of semiconductor elements and switch elements, in a matrix on the imaging surface (the side exposed to radiation) of a flexible substrate. The radiation imaging panel 13 is configured such that when irradiated with radiation, the scintillator emits light according to its intensity and the light is converted into electric charges by semiconductor elements (photodiodes) on the flexible TFT and output as a signal to a COF 16.

Figure 3:
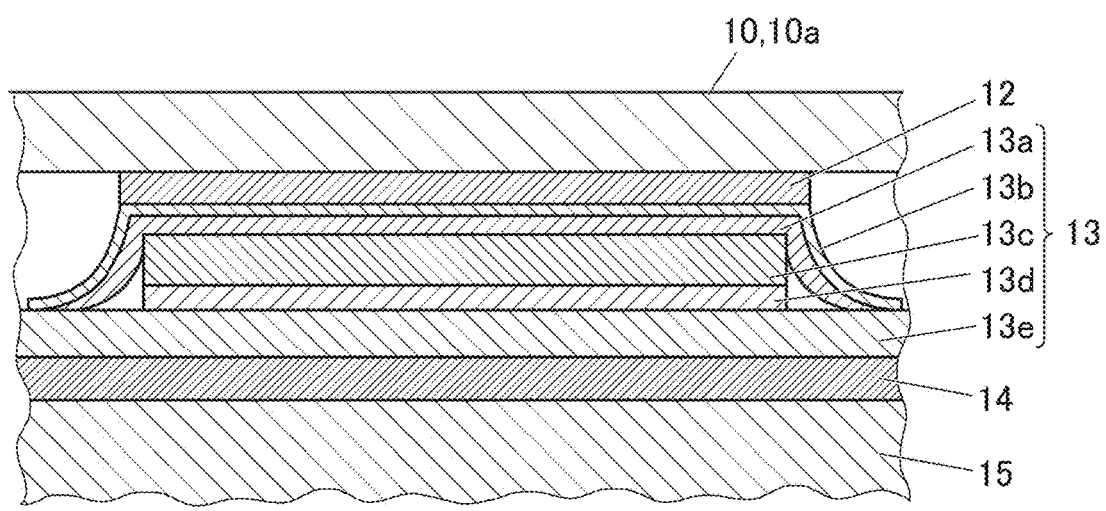
FIG. 3 is a cross-section diagram showing a detailed example of the internal structure of a radiation imaging panel shown in FIG. 2.

FIG. 3 is a cross-section diagram showing a detailed example of the internal structure of a radiation imaging panel 13 in this embodiment. As shown in FIG. 3, the radiation imaging panel 13 includes a scintillator 13c and a TFT-formed substrate 13e that are laminated and sealed by a moisture proof sealing material 13b, such as aluminum film. The TFT-formed substrate 13e is a flexible substrate with resin such as polyimide. The scintillator 13c and the TFT-formed substrate 13e are attached to each other by adhesive or adhesive material 13d. The scintillator 13c and the moisture proof sealing material 13b are fixed to each other by adhesive or adhesive material 13a.

When the internal module 11 is peeled off from the irradiation side exterior 10a at the time of refurbishing the radiation detector 1A, the force equivalent to the adhesive force of the adhesive layer 12 acts on the radiation imaging panel 13, as well, leading to peel off the laminated layers in the radiation imaging panel 13. Once the laminated layers are peeled off in the radiation imaging panel 13, the internal module 11 is no longer reusable. Therefore, there is a need to prevent the laminated layers in the radiation imaging panel 13 from peeling off.

When the peeling-off of the laminated layers in the radiation imaging panel 13 occurs, the peeling starts with the least adhesive layer out of the plurality of laminated layers in the radiation imaging panel 13. Taking the least adhesive force as a panel delamination force, the radiation imaging panel 13 is preferably configured in such a manner that the panel delamination force satisfies the equation (4) below.

Panel delamination force>Adhesive force of Adhesive layer 12×Second safety factor (4)

The second safety factor is also preferably at least 1 and may be suitably selected as with the first safety factor. The use of the adhesive layer 12 which satisfies the equations (3) and (4) can prevent both the damage by the peeling-off of the internal module 11 due to an impact such as drops, and the damage by the peeling-off in the radiation imaging panel 13 at the time of refurbishing the radiation imaging panel 13.

In this embodiment, the first and second safety factors are both set at around 1.5 in order to satisfy both of the equations (3) and (4). The first and second safety factors may be higher when the adhesive and adhesive materials 13a and 13d in the radiation imaging panel 13 are intensified to increase the panel delamination force.

Since the adhesive force increases over time immediately after attachment, a stable value after a predetermined period of time since the attachment is used. The measuring method of adhesive force may be a method such as JISZ0237, for example. Since the acting force may be a shearing force or a pulling force in the vertical direction, the measuring method may be appropriately selected based on the way the peeling-off occurs.

A shielding layer 14 is made of a metal (e.g., lead) that absorbs radiation and is provided between (bonded to) the radiation imaging panel 13 and the spacer 15. The shielding layer 14 prevents backscattered radiation from reaching electrical circuits such as the control board 17a and the interface board 17b. The shielding layer 14 is metal and conductive, so it is connected to the ground (GND) to serve also as an electromagnetic shielding layer for the radiation imaging panel 13.

The spacer 15 is a support for the radiation imaging panel 13, and the boards such as the control board 17a and the interface board 17b. The spacer 15 can be made of metal or resin, but it is preferable to use foam for weight reduction. When a foam is used as the spacer 15, it is not strong enough on its own as a support. Therefore, the overall strength is maintained by attaching it to the exterior 10 together with the radiation imaging panel 13.

The chip on film (COF) 16, which is a flexible substrate, connects the TFTs of the radiation imaging panel 13 to the interface board 17b. On the COF 16, a readout integrated circuit (ROIC), which is not illustrated, is provided. The analog signal from the radiation imaging panel 13 is converted to a digital signal by AD conversion.

The control board 17a includes a CPU, a ROM, a RAM, a communicator and the like. The CPU of the control board 17a controls the radiation imaging panel 13, generates image data from the signals obtained by the radiation imaging panel 13, and outputs the data to the console 2 and the like.

A sensor 18 is provided on the control board 17a. The sensor 18 is an acceleration sensor that detects accelerations along three axes. The measurement values of the sensor 18 are output to the CPU of the control board 17a.

As described in JP2018-91723A, for example, when any one of the accelerations along the X, Y and Z axes output from the sensor 18 exceeds a predetermined output threshold, the CPU of the control board 17a determines that an impact acceleration is detected. For each of the three axes, the CPU accumulates the acceleration at the moment exceeding the predetermined output threshold and N accelerations (N is 32, for example) before and after the acceleration at the moment in the time direction by a predetermined calculation. When the accumulated acceleration exceeds a predetermined threshold, the CPU stores the accumulated acceleration and the date and time of occurrence in the RAM as log information, which is not illustrated. The CPU transmits the stored log information to the server 3 at a predetermined timing by the communicator while associating the log information with information on the radiation detector 1A. The information on the radiation detector 1A includes, for example, the serial number, model, date of manufacture, and installation location (e.g., information on the name and address of the medical facility) of the radiation detector 1A.

A rechargeable battery 19 is a secondary battery that supplies power to the boards, such as a lithium ion capacitor (LiC).

The console 2 is composed of a controller including a CPU or the like, a storage, an operation interface, a display, a communicator and the like, and is a control device that controls imaging by the radiation detector 1A. The console 2 notifies the user by displaying on the display, for example, information on the breakage timing of the radiation detector 1A output from the server 3 and information on the scheduled date of replacement of the radiation detector 1A output from the inventory management system 4, as a notifier.

The server 3 at the service provider collects and analyzes the impact acceleration log information transmitted from the radiation detector 1A and predicts when the radiation detector 1A will be broken.

Figure 4:
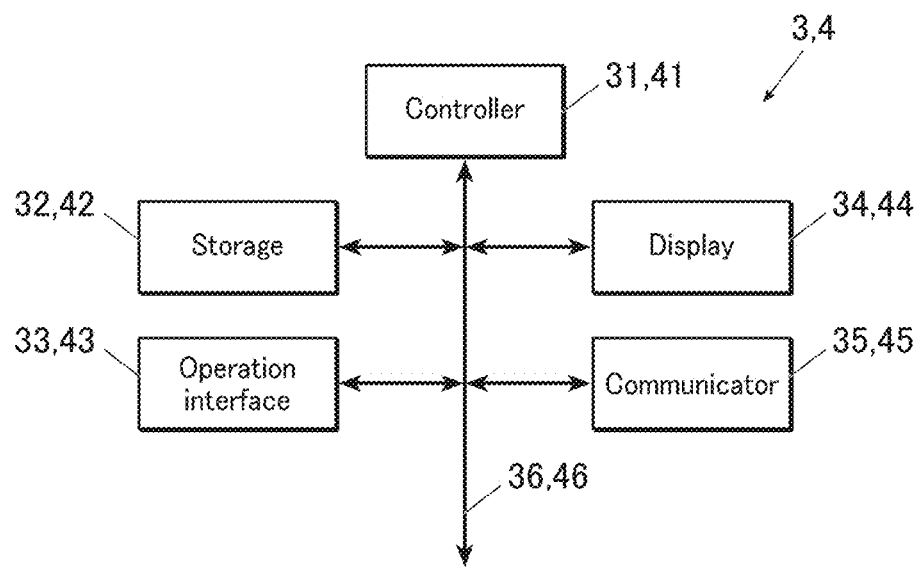
FIG. 4 is a block diagram showing the functional configuration of the server and the inventory management system shown in FIG. 1.

FIG. 4 is a block diagram showing the functional configuration of the server 3.

As shown in FIG. 4, the server 3 includes a controller 31, a storage 32, an operation interface 33, a display 34, a communicator 35, and the components are connected to one another via a bus 36.

The controller 31 (first hardware processor) includes a central processing unit (CPU) and a random access memory (RAM). The CPU of the controller 31 reads out a system program and various processing programs stored in the storage 32, loads them into the RAM, and centrally controls the operation of each part of the server 3 according to the loaded programs. The controller 31 functions as a collector, an analyzer, a breakage timing predictor, and an outputter in cooperation with the program stored in the storage 32.

The storage 32 is composed of a nonvolatile semiconductor memory, a hard disk and the like. The storage 32 stores therein various programs to be executed by the controller 31, parameters necessary to perform processes of the programs, and data such as process results. The programs are stored in the form of a computer readable program codes, and the controller 31 acts in accordance with the program code.

The storage 32 accumulates and stores the log information transmitted from the radiation detector 1A in association with the information on the radiation detector 1A. The storage 32 stores information on the radiation detector 1A whose breakage timing has been predicted, the predicted breakage timing, and information indicating whether a replacement has been accepted or not for the radiation detector 1A, in association with each other.

The operation interface 33 includes a keyboard including a cursor key, numeral input keys, and various function keys, and a pointing device such as a mouse. The operation interface 33 outputs, to the controller 31, an instruction signal which was input through a key operation on the keyboard and a mouse operation performed by the user.

The display 34 is composed of a monitor, such as a liquid crystal display (LCD) or a cathode ray tube (CRT) and displays thereon instructions input from the operation interface 33, data and so forth in accordance with instructions of display signals input from the controller 31. The display 34 functions as a notifier.

The communicator 35 transmits and receives various data to and from external devices (e.g., radiation detector 1A, console 2, inventory management system 4, etc.) connected to a communication network such as the Internet.

The inventory management system 4 is provided at each base of maintenance service, for example, and includes, as shown in FIG. 4, a controller 41, a storage 42, an operation interface 43, a display 44 and a communicator 45. The components are connected to one another via a bus 46.

The controller 41 (second hardware processor) includes a CPU and a RAM, for example. The CPU of the controller 41 reads out a system program and various processing programs stored in the storage 42, loads them into the RAM, and centrally controls the operation of each part of the inventory management system 4 according to the loaded programs. The controller 41 functions as an identifier, a register, and a receiver in cooperation with the program stored in the storage 42.

The storage 42 includes a nonvolatile semiconductor memory, a hard disk or the like. The storage 42 stores therein various programs to be executed by the controller 41, parameters necessary to perform processes of the programs, and data such as process results. The programs are stored in the form of a computer readable program codes, and the controller 41 acts in accordance with the program code.

An inventory management data base (DB) 421 and a replacement management DB 422 are provided in the storage 42.

The inventory management DB 421 is a database for managing the inventory of radiation detectors 1B. In the inventory management DB 421, information (e.g., serial number, model, date of manufacture) regarding radiation detectors 1B in stock is registered.

The replacement management DB 422 is a database for managing replacement management information regarding an accepted replacement of the radiation detector 1A. The replacement management DB 422 stores the replacement management information such as an acceptance number, a scheduled replacement date, information on the radiation detector 1A (e.g., serial number, model, manufacturing date, installation location), and information on the radiation detector 1B (e.g., serial number, model, manufacturing date) to be replaced with the radiation detector 1A, in association with each other.

The configurations of the operation interface 43, the display 44, and the communicator 45 are the same as those described for the operation interface 33, the display 34, and the communicator 35, respectively.

When the mobile terminal 5 receives information on the radiation detector 1A that is predicted to be broken and information on the breakage timing from the server 3, it serves as a notifier to notify the service person by displaying the received information on the display.

Hereinafter, a maintenance service flow for the radiation detector 1A will be described with reference to FIG. 1.

When an acceleration on or above a predetermined threshold is detected by the sensor 18, the CPU of the radiation detector 1A obtains the detected acceleration as the impact acceleration as described above. The obtained impact acceleration (e.g., the accumulated acceleration described above) is stored in a RAM as log information associated with the date and time of occurrence (Step S1).

When the predetermined timing comes, the controller 31 transmits the stored log information to the server 3 together with the information on the radiation detector 1A (Step S2).

The predetermined timing may be, for example, once a day at a predetermined time, or when a certain level of impact acceleration (accumulated acceleration) is recorded.

The log information may be consolidated in the console 2 (stored in the storage of the console 2) and then transmitted from the console 2 to the server 3 together with the information on the radiation detector 1A.

When the server 3 receives the log information and the information on the radiation detector 1A from the radiation detector 1A by the communicator 35, the controller 31 collects the received log information and stores it in the storage 32 (Step S3).

For example, the controller 31 stores the received log information in the storage 32 in association with the information on the radiation detector 1A.

Next, the controller 31 analyzes the collected log information to predict when the radiation detector 1A will be broken and stores the predicted results in the storage 32 in association with the information on the radiation detector 1A (Step S4).

For example, the controller 31 calculates the accumulated value of the log information (accumulated acceleration) of the radiation detector 1A stored in the storage 32. When the accumulated value exceeds a predetermined threshold, the controller 31 predicts the breakage timing.

For example, a method of predicting the breakage timing is to use a table representing the correspondence between the accumulated values of the log information and the predicted breakage timing (e.g., how many days later), which is created and stored in storage 32 in advance. The table is created from the accumulated values of log information stored for a plurality of radiation detectors 1A that were broken in the past (radiation detectors of the same model as the radiation detector 1A corresponding to the received log information) and the statistical data for the period of time from the time when each of the accumulated value is calculated to the time when the corresponding radiation detector 1A is actually broken. The controller 31 predicts the breakage timing of the radiation detector 1A based on the calculated accumulated values and the table stored in storage 32.

Alternatively, an accumulated value at which breakage is likely to occur may be set as the breakage threshold based on data in the past, the accumulated value and the date and time of recording it may be stored as history data for each of radiation detectors 1A, and the gradient of the accumulated value increasing with time may be calculated from the history data. The date and time when the accumulated value reaches the breakage threshold may be estimated as the breakage timing by extrapolating the gradient to the history data.

Alternatively, artificial intelligence (AI) such as machine learning may be used to predict when radiation detector 1A will be broken. For example, a learned model that has learned the correlation between the accumulated values and the breakage timing may be created based on multiple data sets consisting of a combination of the accumulated values of log information for a plurality of radiation detectors 1A that were broken in the past (radiation detectors of the same model as the radiation detector 1A corresponding to the received log information) and the time periods from the time when the accumulated values are calculated to the time when the radiation detectors 1A were actually broken. Then the breakage timing may be predicted by inputting the accumulated value to the created learned model. The breakage threshold and history data mentioned above may be used as training data.

Next, the controller 31 outputs the information on the radiation detector 1A and the predicted breakage timing in association with each other (Step S5).

In Step S5, the controller 31 outputs the information on the radiation detector 1A and the predicted breakage timing to, for example, the display 34 of the server 3 and/or an audio output unit not shown in the figures. Alternatively, the controller 31 outputs the information to the console 2, the inventory management system 4, and the mobile terminal 5 of the service person via the communicator 35. If the radiation detector 1A has a display, the controller 31 may also output the information to the radiation detector 1A.

The output of Step S5 is preferably performed when the breakage timing (the period of time until breakage; the number of days, for example) is on or below a predetermined threshold. By outputting only information on radiation detectors 1A that are about to be broken, the service person and the user can easily identify a radiation detector 1A that needs to be replaced.

Through the display 34, the audio output unit, the console 2, the inventory management system 4 and the mobile terminal 5 to which the information on the radiation detector 1A and the information on the predicted breakage timing have been output, the information on radiation detector 1A and the information on the predicted breakage timing are notified to a user and service person (Steps S6 to S9).

In Steps S6 to S9, each device outputs (displays) the information on the radiation detector 1A and the predicted breakage timing to notify the user or service person.

The console 2 notifies the user of the information on the radiation detector 1A and the predicted breakage timing, so that the user can be alerted to delay the breakage or limit its use. In addition, the inventory management system 4 and mobile terminal 5 notify the information on the radiation detector 1A and the predicted breakage timing, so that the service person can identify the radiation detector 1A that needs to be replaced and perform a replacement.

In addition, by indicating on the display of the radiation detector 1A that the breakage timing is coming, it is possible to alert the user. When the service person replaces the radiation detector 1A, it is easy for him to recognize that the radiation detector 1A to be replaced, which can eliminate errors.

In the inventory management system 4, when displaying the notification on the display 44, the controller 41, for example, also displays a replacement request button to instruct implementation of the replacement service. When the replacement request button is pressed on the operation interface 43, the controller 41 transmits to the server 3 that the replacement of the radiation detector 1A has been requested and registers the replacement management information on the radiation detector 1A in the replacement management DB 422 so as to accept the replacement request of the radiation detector 1A (Step S10).

For example, when the replacement request button is pressed, the controller 41 issues an acceptance ID, displays the replacement request screen on the display 44, and receives input such as a scheduled replacement date. The controller 41 registers the acceptance ID, acceptance date and time, scheduled replacement date and information on radiation detector 1A in the exchange management DB 422 as the replacement management information. The scheduled replacement date may be automatically determined by the controller 41 based on the predicted breakage timing of the radiation detector 1A.

Next, the controller 41 refers to the inventory management DB 421, identifies a radiation detector 1B to be used for the replacement with the radiation detector 1A from inventory, and then adds it to the replacement management information of the exchange management DB 422 (Step S11).

For example, the controller 41 identifies a radiation detector 1B for replacement by searching the database 421 for an inventory of the same model as the radiation detector 1A based on the information on the radiation detector 1A output from the server 3, and then displays the information (e.g., serial number, model, date of manufacture) on the identified radiation detector 1B on the replacement reception screen of the display 44 and registers the replacement management information of the radiation detector 1A of the exchange management DB 422. The controller 41 deletes the information on the identified radiation detectors 1B from the inventory management DB 421.

When displaying the notification on the mobile terminal 5, the replacement request button may also be displayed in the same manner, so that an input related to replacement request can be performed on the mobile terminal 5.

Next, the controller 41 outputs (transmits) the notification information such as the scheduled replacement date to the radiation detector 1A or the console 2 using the communicator 45 (Step S12).

The radiation detector 1A or console 2 notifies the user by displaying the scheduled replacement date and the like on the display (Step S13).

In response to an instruction to create a replacement route on a specified date using the operation interface 43 (or mobile terminal 5), the controller 41 may extract replacement management information having the scheduled replacement date of the specified date and time from the exchange management DB 422, create the replacement route based on the installation location of the radiation detector 1A to be replaced, and display the replacement route on the display 34 (or mobile terminal 5).

On the scheduled replacement date, the service person visits the medical facility where the radiation detector 1A to be replaced is installed, brings the replacement radiation detector 1B that has been identified in advance, and replaces the radiation detector 1A with the radiation detector 1B (Step S14). The service person then removes the radiation detector 1A from the medical facility and transport it to the repair site 6 (Step S15).

If the service person is unable to visit the medical facility due to various reasons, only the radiation detector 1B may be sent and the user may perform the replacement work. In this case, the user can easily perform the replacement work by setting the radiation detector 1B while receiving instructions from the service person via remote communication or by following the guidance displayed on the console 2 using the remote maintenance function. The replaced radiation detector 1A is returned to the service provider by the user. Radiation detectors may be sent and returned using a specialized carrier or a common courier service.

After the replacement, the service person records the replacement completion date in the replacement management information of the replaced radiation detector 1A in the exchange management DB 422 using the operation interface 43 (or mobile terminal 5).

At the repair site 6, the radiation detector 1A is refurbished (Step S16).

For example, the exterior 10 of the radiation detector 1A is replaced with a new one, and if necessary, the internal parts are also repaired or replaced to make a refurbished radiation detector 1A'.

As described above, the internal module 11 of the radiation detector 1A in this embodiment is peelably attached to the inner surface of the exterior 10, so that the internal module 11 can be easily peeled off from the exterior 10 and the exterior 10 can be replaced during repair.

Figure 5:
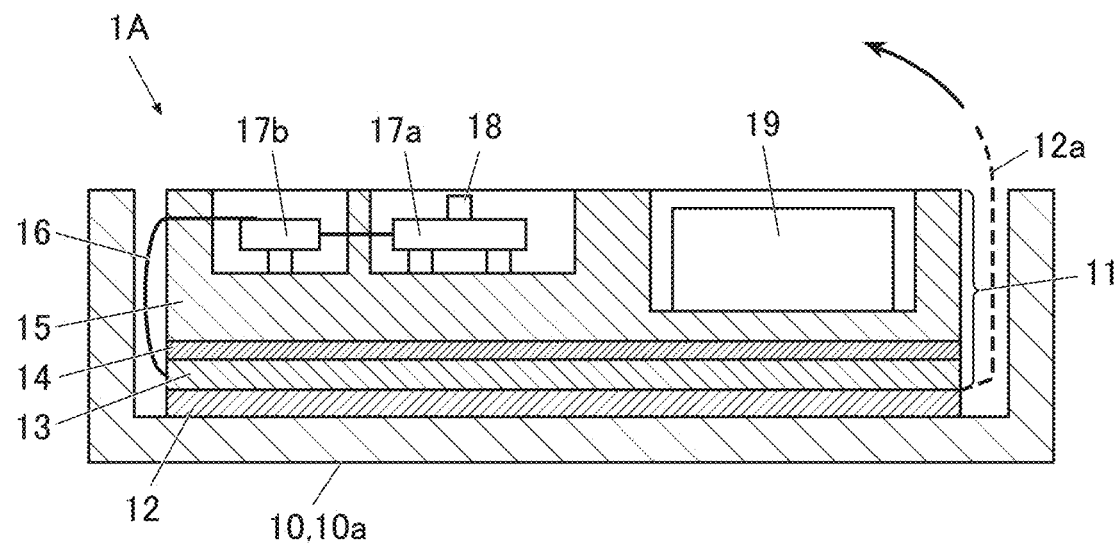
FIG. 5 is a schematic diagram illustrating replacement of the internal module of the radiation detector shown in FIG. 2.

For example, as shown in FIG. 5, the rear side exterior 10b of the radiation detector 1A is removed from the irradiation side exterior 10a, and the internal module 11 can be peeled off from the irradiation side exterior 10a by pulling the peeling aid 12a. The control board 17a, interface board 17b, rechargeable battery 19 and the like may be removed before peeling off the internal module 11. By keeping the maximum curvature of the internal module 11 during peeling to a radius of 20 cm or more, the internal module 11 can be peeled off without affecting the TFTs and scintillators of the radiation imaging panel 13. The peeling off may occur at the interface between the adhesive layer 12 and the radiation imaging panel 13, or the interface between the irradiation side exterior 10a and the adhesive layer 12.

The peeling aid 12a is preferably provided on the side where there is no COF 16. The risk of damaging the COF 16 during peeling can be lowered.

The radiation detector 1A' whose parts such as the exterior 10 have been replaced or repaired is registered as a radiation detector 1B in the inventory of the service location in the inventory management DB 421 (Step S17) and is operated as a new service inventory for the maintenance service (Step S18).

The refurbished radiation detector 1A' may be sold as a low-cost product.

Thus, in the maintenance service shown in FIG. 1 the breakage timing based on the log information of the sensor 18 of radiation detector 1A can be predicted, and the radiation detector 1A can be replaced before the exterior 10 is broken, thereby the downtime at the medical facility can be significantly reduced. In addition, since the exterior 10 can be repaired or replaced before it is broken, the radiation imaging panel 13 and other parts inside can be reused for refurbished products, thereby the cost incurred by the maintenance service and passed on to the user can be significantly reduced.

As described above, the radiation detector 1A has a sensor 18 that detects the applied impact acceleration, and the controller 31 of the server 3 of the maintenance service collects the impact acceleration detected by the sensor 18, analyzes the collected impact acceleration, and predicts the breakage timing of the radiation detector 1A. The console 2, the display 34 of server 3, the display 44 of inventory management system 4, and the mobile terminal 5 notifies information on the predicted breakage timing of the radiation detector 1A.

Therefore, the user of the radiation detector 1A or the service person is able to learn the breakage timing of the radiation detector 1A, which enables them to repair or replace the radiation detector 1A before it becomes unusable, thereby reducing downtime and costs due to radiation detector breakage.

The radiation detector 1A includes a radiation imaging panel 13 having a flexible substrate and a semiconductor element formed on the imaging surface of the substrate, which can prevent the substrate from being broken by a shock to become suddenly unusable unlike a conventional radiation detector having semiconductor elements on a glass substrate.

Since the breakage timing of the radiation detector 1A is predicted by accumulating the impact acceleration in the analysis, it is possible to predict the breakage timing with high accuracy.

In addition, the inventory management system 4 has the inventory management DB 421 in which information on radiation detector 1B in stock is registered. The controller 41 specifies the radiation detector 1B to be replaced with the radiation detector 1A that is predicted to be broken based on the information on the radiation detector 1B registered in the inventory management DB 421. Therefore, it is possible to replace the radiation detector 1A that is predicted to be broken with the appropriate radiation detector 1B.

Since the controller 41 registers information on the radiation detector whose parts have been replaced or repaired in the inventory management DB 421, the radiation detector whose parts have been replaced or repaired can be managed as the inventory of the replacement radiation detector 1B.

The controller 41 of the inventory management system 4 accepts the replacement of the radiation detector 1A based on the notified information on the breakage timing of the radiation detector 1A and stores the replacement management information of the radiation detector 1A to the exchange management DB 422.

Accordingly, the replacement of the radiation detector 1A can be accepted at the appropriate time. This can also simplify the effort of the user and service person for the replacement of radiation detector 1A.

The description in the above embodiment is a preferable example of maintenance service using the breakage timing prediction system, replacement system, analysis device, and analysis method for radiation detectors according to the present invention, and the present invention is not limited thereto.

For example, in the above embodiment, the collection and analysis (prediction of the breakage timing) of the log information is performed on the server 3, but it can also be performed in the radiation detector 1A or console 2.

The server 3 and the inventory management system 4 may be integrated. In other words, the server 3 may also serve as the inventory management system 4.

In the above embodiment, the case of predicting the breakage timing using the impact acceleration detected by the sensor 18 as a physical quantity applied to the radiation detector 1A is described as an example. However, instead of or in addition to the sensor 18 that detects the impact acceleration, a sensor that detects angular velocity or gravity acceleration may be provided in the radiation detector 1A, and the detection results of these sensors may be used to predict the breakage timing. Further, a sensor that detects at least one of temperature, humidity, air pressure, amount of strain, pressure, and amount of light may be provided in the radiation detector 1A, and the results of such detection may be taken into account to predict the breakage timing.

The above description discloses an example of using a hard disk, a semiconductor nonvolatile memory or the like as the computer readable medium of the program according to the present invention. However, the present invention is not limited to the example. A portable recording medium such as a CD-ROM can be applied as the computer readable medium. A carrier wave is also applied as a medium providing the program data according to the present invention via a communication line.

As for the other detailed configurations and detailed operations of each device of the maintenance service, modifications can be made as needed within the scope of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A breakage timing prediction system of a radiation detector, the system comprising:
a sensor that detects a physical quantity applied to a radiation detector;
a first hardware processor that:
collects information on the physical quantity detected by the sensor, and
analyses the collected information on the physical quantity to predict a breakage timing of the radiation detector; and
a notifier that gives a notification of information on the predicted breakage timing of the radiation detector;
wherein the physical quantity is at lease one of impact acceleration, angular velocity, gravity acceleration, temperature, humidity, air pressure, amount of strain, pressure, and amount of light, and
wherein the radiation detector includes a flexible substrate and a semiconductor element formed on an imaging surface of the substrate.

2. The breakage timing prediction system according to claim 1, wherein the analysis includes accumulating the physical quantity to predict the breakage timing of the radiation detector.

3. The breakage timing prediction system according to claim 1, wherein the notifier is provided in at least any one of the radiation detector, a control device that controls imaging by the radiation detector, a server including the first hardware processor that collects the information on the physical quantity of the radiation detector, and a mobile terminal.

4. A radiation detector replacement system comprising:
a first hardware processor that:
collects information on a physical quantity applied to a radiation detector, and
analyses the collected information on the physical quantity to predict a breakage timing of the radiation detector;
a notifier that gives a notification of information on the predicted breakage timing of the radiation detector;
a database in which information on inventory of the radiation detector is registered; and
a second hardware processor that specifies a radiation detector to be replaced with the radiation detector that is predicted to be broken based on the information on the radiation detector registered in the database;
wherein the physical quantity is at lease one of impact acceleration, angular velocity, gravity acceleration, temperature, humidity, air pressure, amount of strain, pressure, and amount of light, and
wherein the radiation detector includes a flexible substrate and a semiconductor element formed on an imaging surface of the substrate.

5. The radiation detector replacement system according to claim 4, wherein the second hardware processor registers information on a radiation detector whose part has been replaced or repaired in the database.

6. A radiation detector replacement system comprising:
a first hardware processor that:
collects information on a physical quantity applied to a radiation detector, and
analyses the collected information on the physical quantity to predict a breakage timing of the radiation detector;
a notifier that gives a notification of information on the predicted breakage timing of the radiation detector;
a second hardware processor that accepts replacement of the radiation detector based on the information on the breakage timing of the radiation detector notified by the notifier; and
a database that stores replacement management information on the accepted replacement of the radiation detector;
wherein the physical quantity is at lease one of impact acceleration, angular velocity, gravity acceleration, temperature, humidity, air pressure, amount of strain, pressure, and amount of light.

7. The radiation detector replacement system according to claim 6, wherein the radiation detector includes a flexible substrate and a semiconductor element formed on an imaging surface of the substrate.

8. The radiation detector replacement system according to claim 6, wherein the analysis includes accumulating the physical quantity to predict the breakage timing of the radiation detector.

9. The radiation detector replacement system according to claim 6, wherein the notifier is provided in at least any one of the radiation detector, a control device that controls imaging by the radiation detector, a server including the first hardware processor that collects the information on the physical quantity of the radiation detector and a mobile terminal.

10. An analysis device comprising:
a first hardware processor that:
collects information on a physical quantity applied to a radiation detector,
analyses the collected information on the physical quantity to predict a breakage timing of the radiation detector, and
outputs information on the predicted breakage timing;
wherein the physical quantity is at lease one of impact acceleration, angular velocity, gravity acceleration, temperature, humidity, air pressure, amount of strain, pressure, and amount of light, and
wherein the radiation detector includes a flexible substrate and a semiconductor element formed on an imaging surface of the substrate.

11. The analysis device according to claim 10, wherein the analysis includes accumulating the physical quantity to predict the breakage timing of the radiation detector.

12. An analysis method comprising:
collecting information on a physical quantity applied to a radiation detector;
analyzing the collected information on the physical quantity to predict a breakage timing of the radiation detector; and
outputting information on the predicted breakage timing;
wherein the physical quantity is at lease one of impact acceleration, angular velocity, gravity acceleration, temperature, humidity, air pressure, amount of strain, pressure, and amount of light, and wherein the radiation detector includes a flexible substrate and a semiconductor element formed on an imaging surface of the substrate.

\* \* \* \* \*